(12) United States Patent
Smith et al.

(10) Patent No.: US 8,923,321 B2
(45) Date of Patent: Dec. 30, 2014

(54) APPARATUS AND METHOD FOR HANDLING CONTROL CHANNEL RECEPTION/DECODING FAILURE IN A WIRELESS VOIP COMMUNICATION SYSTEM

(75) Inventors: Jack A. Smith, Valley View, TX (US); Hao Bi, Lake Zurich, IL (US); Sean M. McBeath, Keller, TX (US); James M. O'Connor, Dallas, TX (US); Danny T. Pinckley, Arlington, TX (US); John D. Reed, Arlington, TX (US)

(73) Assignee: Motorola Mobility LLC, Libertyville, IL (US)

( * ) Notice: Subject to any disclaimer, the term of this patent is extended or adjusted under 35 U.S.C. 154(b) by 1656 days.

(21) Appl. No.: 11/460,908

(22) Filed: Jul. 28, 2006

(65) Prior Publication Data

US 2008/0025337 A1    Jan. 31, 2008

(51) Int. Cl.
*H04W 72/00* (2009.01)
*H04W 72/04* (2009.01)
*H04W 28/04* (2009.01)

(52) U.S. Cl.
CPC ........ *H04W 72/005* (2013.01); *H04W 72/0406* (2013.01); *H04W 28/04* (2013.01)
USPC ............ 370/439; 370/328; 370/227; 370/228

(58) Field of Classification Search
CPC ..... H04L 47/70; H04L 5/0055; H04L 5/0007; H04W 28/04; H04W 72/0406; H04W 72/005
USPC ......................... 370/328, 227–228
See application file for complete search history.

(56) References Cited

U.S. PATENT DOCUMENTS 5,946,306 A * 8/1999 Talarmo ........................ 370/337
6,839,356 B2 * 1/2005 Barany et al. ................. 370/401

(Continued)

FOREIGN PATENT DOCUMENTS

| EP | 0589280 B1 | 12/1998 |
| EP | 1542487 A1 | 6/2005 |
| GB | 2328845 A | 3/1999 |

OTHER PUBLICATIONS

Patent Cooperation Treaty, "PCT Search Report and Written Opinion of the International Searching Authority" for International Application No. PCT/US2007/073482 dated Apr. 10, 2008, 16 pages.

*Primary Examiner* — George Eng
*Assistant Examiner* — Jing Gao
(74) *Attorney, Agent, or Firm* — Lerner, David, Littenberg, Krumholz & Mentlik, LLP

(57) ABSTRACT

A base station (103) assigns a set of mobile stations (101) to a group wherein the group will share a set of radio resources (710). A shared control channel information element (501) is sent to the group of mobile stations (101) and provides a bitmap having fields for group ordering (511), resource allocations (530), failure handling resources (540), and an ordering pattern (513). If a mobile station fails to decode the shared control channel information element (501) it will access the failure handling resources in order to receive data. The failure handling channel may be persistent in some embodiments, or may be released after the mobile station is once again able to decode the shared control channel information element (501) and thereby share in the shared resource pool allocated to its mobile station group.

20 Claims, 12 Drawing Sheets

(56) References Cited

U.S. PATENT DOCUMENTS

| | | | |
|---|---|---|---|
| 7,343,170 B1* | 3/2008 | Feeney et al. | 455/509 |
| 7,436,763 B1* | 10/2008 | Phelps et al. | 370/219 |
| 7,751,363 B1* | 7/2010 | Etemad et al. | 370/329 |
| 2004/0057402 A1* | 3/2004 | Ramos et al. | 370/329 |
| 2004/0087320 A1* | 5/2004 | Kim et al. | 455/458 |
| 2004/0093548 A1* | 5/2004 | Heo et al. | 714/749 |
| 2004/0160936 A1* | 8/2004 | Liu et al. | 370/348 |
| 2005/0157678 A1* | 7/2005 | Mantha et al. | 370/329 |
| 2005/0216938 A1* | 9/2005 | Brady et al. | 725/76 |
| 2006/0212333 A1* | 9/2006 | Jackson | 705/8 |
| 2009/0022098 A1* | 1/2009 | Novak et al. | 370/329 |

\* cited by examiner

APPARATUS AND METHOD FOR HANDLING CONTROL CHANNEL RECEPTION/DECODING FAILURE IN A WIRELESS VOIP COMMUNICATION SYSTEM

FIELD OF THE DISCLOSURE

The present disclosure relates generally to Voice-over-Internet-Protocol (VoIP) wireless communication networks and more particularly to handling control channel reception failures by wireless communications mobile stations in a group sharing a set of time-frequency resources.

BACKGROUND

Wireless communications systems, for example packet based communications systems, may provide voice telephony using the Voice-over-Internet-Protocol (VoIP). Any historical demarcation between "data" and "voice" has become blurred in packet based communications systems such that the term "data" usually signifies payload information for any service, whether voice, or data such as may be provided by downloading from the Internet.

Differences remain however, in that voice will generally employ smaller packet sizes, for example due to delay sensitivity, than would traditional so-called data. For, example a non-voice data packet may be larger than a kilo-byte while a voice packet may be only approximately 15 to 50 bytes depending upon the vocoder rate employed.

Because of the smaller packet sizes utilized by voice sessions, a greatly increased number of voice users may be served thereby placing a burden on the control mechanisms and resources of the communications system.

For example, multiple voice users may form a group that shares a common control channel for allocating specific time-frequency resources, that is, traffic resources, to the multiple users. However, there is a possibility that some users in the group may not receive, or be able to correctly decode, the control channel information due to various reasons such as radio shadowing or fading. A possible solution may involve providing temporary, but specific control resources to a user that has not received a previously transmitted control message. However, such control resources require additional processing and transmission and therefore consumes even more resources which would have been available for voice traffic thus further burdening the network.

Thus, there is a need for handling mobile stations that have failed to receive a control message, without significantly increasing the overhead of the communication system.

DETAILED DESCRIPTION

Figure 1:
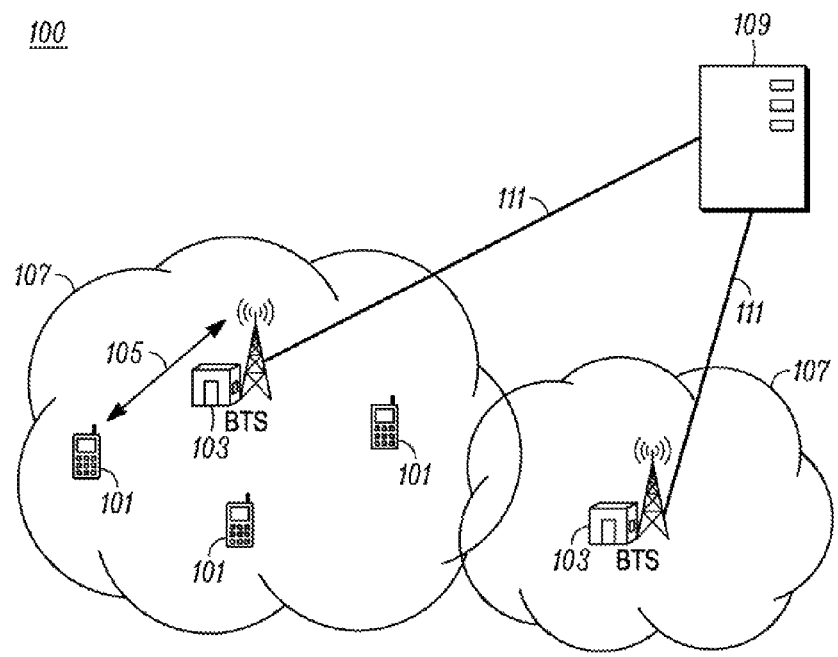
FIG. 1 is a block diagram of a wireless communication network.

Turning now to the drawings wherein like numerals represent like components, FIG. 1 illustrates a communications network 100, with various base stations 103, each base station 103 having a corresponding coverage area 107. In general, base station coverage areas may overlap and, in general, form an overall network coverage area. The base stations may be referred to by other names such as base transceiver station (BTS), "Node B", and access node (AN), depending on the technology. A network coverage area may comprise a number of base station coverage areas 107, which may form a contiguous radio coverage area. However, it is not required to have contiguous radio coverage and therefore a network coverage area may alternatively be distributed.

Furthermore, each coverage area may have a number of mobile stations 101. A number of bases stations 103 will be connected to a base station controller 109 via backhaul connections 111. The base station controller 109 and base stations form a Radio Access Network (RAN). The overall network may comprise any number of base station controllers, each controlling a number of base stations. Note that the base station controller 109 may alternatively be implemented as a distributed function among the base stations 103. Regardless of specific implementations, the base station controller 109 comprises various modules for packetized communications such as a packet scheduler, packet segmentation and reassembly, etc., and modules for assigning appropriate radio resources to the various mobile stations 101.

The base stations 103 may communicate with the mobile stations 101 via any number of standard air interfaces and using any number of modulation and coding schemes. For example, Universal Mobile Telecommunications System (UMTS), Evolved UMTS (E-UMTS) Terrestrial Radio Access (E-UTRA) or CDMA2000 may be employed. Further, E-UMTS may employ Orthogonal Frequency Division Multiplexing (OFDM) and CDMA2000 may employ orthogonal spreading codes such as the Walsh codes. Semi-orthogonal spreading codes may also be utilized to achieve additional channelization over the air interface. Further the network may be an Evolved High Rate Packet Data (E-HRPD) network. Any appropriate radio interface may be employed by the various embodiments.

Figure 2:
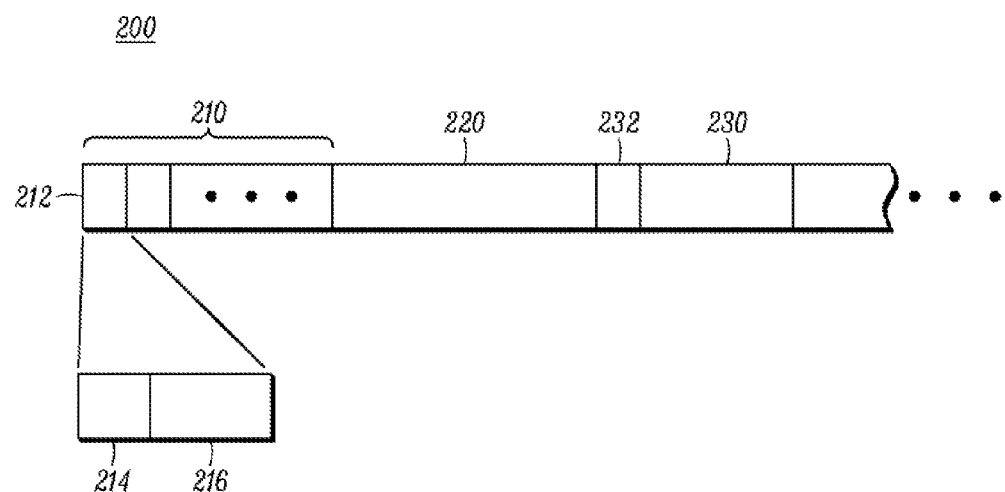
FIG. 2 is block diagram of a sequence of super frames each comprising a several frames.

FIG. 2 illustrates a sequence of super frames 200 useful for communicating in the wireless communication systems of the various embodiments. In FIG. 2, the super frame sequence generally comprises a number of super frames 210, 220, 230, etc., wherein each super frame comprises a number of frames. For example, super frame 210 comprises a frame 212 having a resource assignment control channel portion within a control channel portion 214 and a data channel portion 216.

Figure 3:
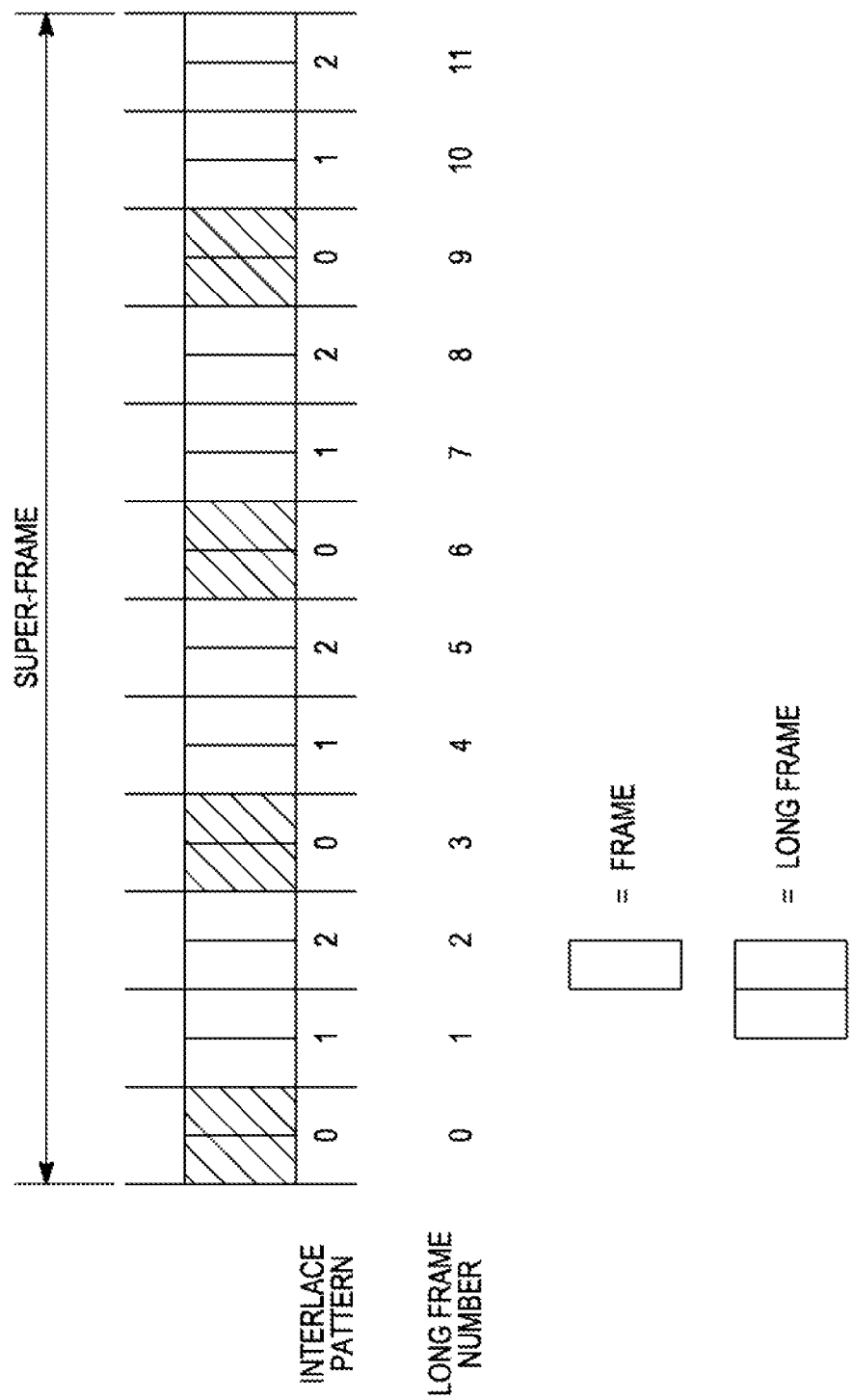
FIG. 3 is diagram showing a sequence of long frames each comprising one or more frames.

FIG. 3 illustrates a sequence of repeating long frames, wherein two frames are grouped to form a long frame. In some embodiments, a long frame is equivalent to a single frame. An interlace pattern is defined as a sequence of regularly distanced long frames. For systems employing synchronous hybrid automatic repeat request (HARQ) (S-HARQ), the initial and subsequent transmissions typically occur in the same interlace pattern. In this illustrative example, 12 long frames, denoted long frame 0 through 11, make up a superframe.

For orthogonal frequency division multiple access (OFDMA) systems, the frequency domain is divided into subcarriers. For example, a 5 MHz OFDMA carrier, may be divided into 480 subcarriers, with a subcarrier spacing of 9.6 kHz. An OFDMA frame may be divided into multiple OFDM symbols. For example, a frame may occupy 0.91144 msec and contain 8 OFDM symbols, where each symbol occupies approximately 113.93 μsec. The subcarriers are grouped to form block resource channels (BRCH) and distributed resource channels (DRCH). A BRCH is a group of contiguous subcarriers that may hop within a larger bandwidth, while a DRCH is a group of noncontiguous sub-carriers.

In the various embodiments, the base station controller 109, the base stations 103, or some other network infrastructure component groups mobile stations 101 into one or more groups for scheduling purposes. The mobile stations 101 may be grouped based on radio channel conditions associated with the mobile stations, for example, channel quality information reported by the mobile stations, Doppler reported by the mobile stations, distance from the serving cell, etc. Alternatively, or additionally, the mobile stations 101 may be grouped based on one or more mobile station operating characteristics other than participation in a common communication session. Exemplary mobile station operating characteristics include power headroom of the mobile stations, macro diversity considerations, mobile station capability, service of the mobile station, codec rate, etc. Further, mobile stations with an active VoIP session may be grouped together.

In another embodiment, the base station controller 109, the base stations 103, or some other network infrastructure component may assign multiple mobile stations to the same group position. For example, all mobile stations participating in the same group call may be assigned to the same group position. Similarly, all mobile stations registered for a particular broadcast/multicast session may be assigned to the same group position. In this way, the base station indicates the presence or absence of a group call or a broadcast/multicast session to several mobile stations using a single bit in the shared control channel, thereby reducing group overhead. In this embodiment, a mobile station may be assigned more than one group position within the same group. For example, the base station may assign a mobile station one group position for broadcast/multicast and another group position for VoIP.

After the group of mobile stations has been determined, the base station 103 sends an indication to the mobile stations 101 of each mobile station's position in the group and an indication of the group identifier. A control channel may be used to send the indications. The base station 103 may use the group identifier to send control information valid for the entire group. For example, the base station 103 may change the frequency allocation for the group by sending an indication of the group identifier and an indication of the new frequency allocation. The position indications may be sent to each mobile station separately or may be sent to several mobile stations at once.

For example, the base station 103 may send a list of wireless mobile station unique identifiers along with a group identifier. Any appropriate rule may be used to determine the position indication, for example, the first mobile station in the list of unique identifiers may be assigned the first position, the second mobile station in the list of unique identifiers may assigned the second position, etc. The mobile station unique identifier may be an Electronic Serial Number (ESN), a subscriber hardware identifier, a Medium Access Control Identifier (MAC-Id), or any other suitable identifier that uniquely identifies a particular mobile station.

Figure 4:
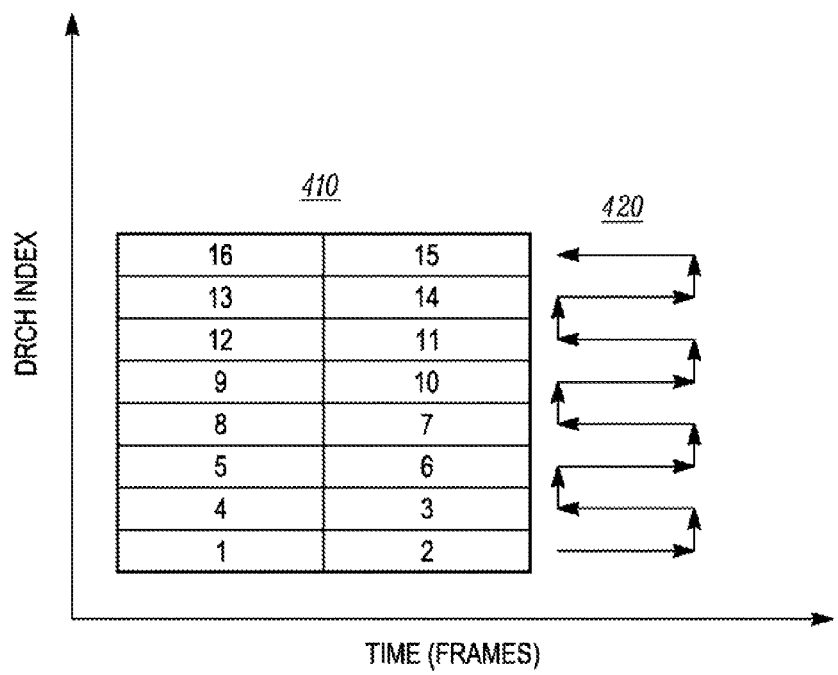
FIG. 4 is logical diagram representation of a set of shared resources.

For each mobile station group, a scheduling function of the base station controller 109, or base station 103, may assign a set of time-frequency resources to be shared by the mobile stations in the group. FIG. 4 shows an exemplary set of shared resources. In FIG. 4, the shared resources 410 are two frames (one long frame) and eight DRCHs. If a block is defined as one frame in the time domain and one DRCH in the frequency domain, then there are 16 blocks or resources, numbered 1 through 16. As previously discussed, a DRCHs is a group of non-contiguous subcarriers, so the DRCH Index which is the vertical axis of FIG. 4, is a logical representation of the frequency domain. As will be discussed later, each mobile station determines its portion of the shared resource, based on the assignments for other mobile stations. Therefore, it is necessary to define the order in which the resources are to be allocated. In FIG. 4, an illustrative ordering pattern 420 is given which results in the blocks being numbered 1 through 16 as shown in FIG. 4. The set of shared resources may be repeatedly used in an interlace pattern as described with respect to FIG. 3. For example, the 16 resources may be repeatedly used in each long frame of interlace pattern 0 in FIG. 3. Again, the 16 resources illustrated by FIG. 4 are logical representations of a set of sub-carriers in the frequency domain in a frame. It is to be understood that the exact physical location of these sub-carriers may change from frame to frame.

An indication of the set of shared resources and the ordering pattern may be signaled from the base station 103 to the mobile stations 101 using a control channel. Further, the control channel may be transmitted in any frame with a predefined relationship with the beginning frame of the set of shared resources. The set of shared resources may begin in the same frame the control channel is transmitted, may have a fixed starting point relative to the frame that the control channel is transmitted, or may be explicitly signaled in the control channel.

After the mobile stations are grouped, assigned a position (also called location) within the group, and a set of shared resources is assigned to the group, the base station 103 must indicate which mobile stations are active in a given time period, and, in some embodiments, the number of assigned resources assigned to each mobile station.

Figure 5A:
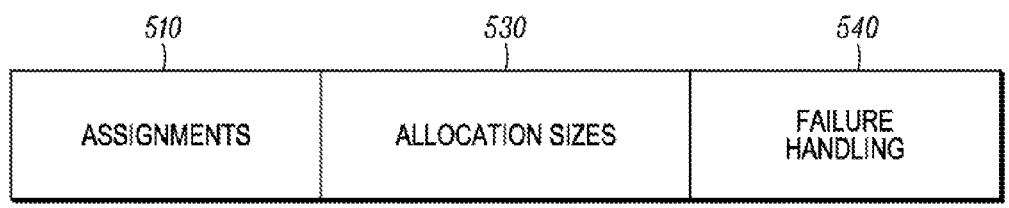
FIGS. 5a and 5b are diagrams of bitmaps sent in a shared control channel for resource assignment purposes.

FIG. 5a illustrates how resource assignments may be indicated to mobile stations 101. In FIG. 5, a first message field, mobile station assignments 510, indicates which mobile stations are assigned at least one of the shared resources in the corresponding set of group shared resources. A mobile station resource allocation field 530 may indicate specific resources, and/or the number of resources assigned to each mobile station. In the various embodiments, a failure handling field 540 may also be included as will be described further below.

Figure 5B:
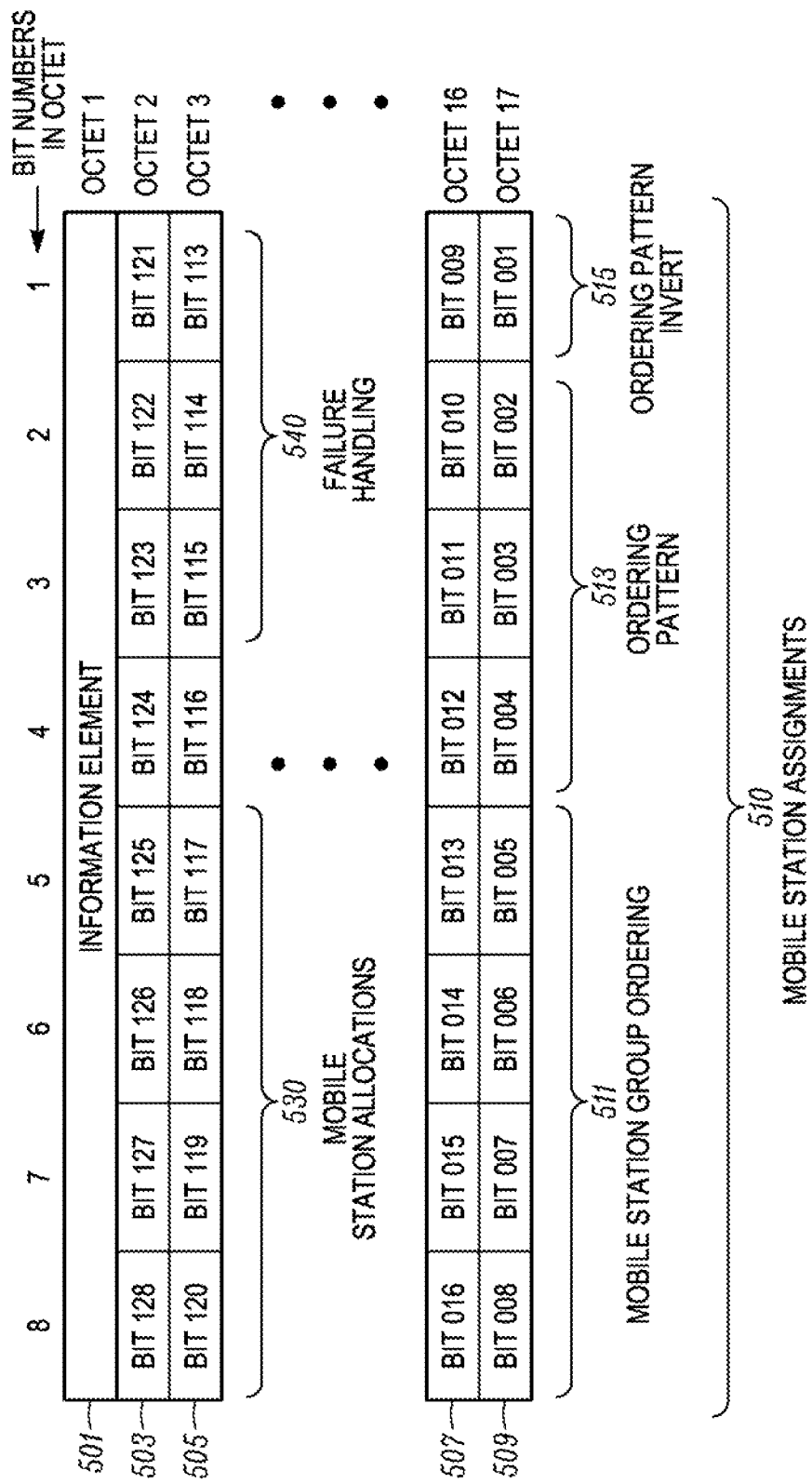

FIG. 5b show an example with further details of how the message of FIG. 5a may convey information using bit mapping. FIG. 5b represents an information element 501 which as discussed above, may be sent to the mobile station over a control channel. In the case of a mobile station group as discussed above, the information element 501 may be sent using a shared control channel. The information element 501 may comprise a number of octets as shown, and may vary in size depending on, for example, the number of mobile stations in a group, sharing the control channel. Therefore, the information element 501 may be any appropriate size for conveying the necessary information to the mobile station group.

Thus, the mobile station assignments 510 may comprise a number of bitmap fields, for example Bits 001 through bit 008 of octet 17, item 509, as shown in FIG. 5b. In the example illustrated, the position of any mobile station within its group may corresponds to its bitmap position. For example, the mobile station assigned the first group position, "position 1" may determine if it is assigned one of the shared resources using bitmap position 001. In the example illustrated by FIG. 5b, the mobile station positions are indicted by mobile station group ordering field 511. Thus, the first mobile station position in the example of FIG. 5b would correspond to Bit 005, which is the first position of the mobile station group ordering field 511. The mobile station assigned group position 2 may determine if it is assigned one of the shared resources using second position of the mobile station group ordering field 511, etc. Thus it is to be understood that a bitmap filed may comprise one or more bits, and that a group of bits may be used for any designation or indication. For example, an active user indication may be provided by using either a binary "0" or a "1", where inactive users are indicated using the opposite state, or some other appropriate binary values may be used.

Returning to FIG. 5b, active mobile stations may be indicated using a binary "1" in an appropriate corresponding position of the assignment bitmap 510 which is contained in the information element 501. Some embodiments, may include a single bit located at the logical beginning, or any other appropriate location or field, of the assignment bitmap 510, denoted the "ordering pattern invert field" 515. For example, the binary value of a bit, such as Bit 001, may indicate whether to follow a specifically designated ordering pattern in ascending or descending order. Thus, a binary '0' may indicate that the mobile stations should use a first designated ordering pattern in ascending order (not inverted), while a binary '1' may indicate that the ordering pattern should be inverted, that is, in descending order.

In other embodiments, several ordering patterns may be established, and the base station 103 may indicate the ordering pattern to be used by the mobile station 101 group via ordering pattern field 513 of the assignment bitmap 510. Therefore the base station 103 may indicate the desired ordering pattern during each scheduling instance. Further, the ordering pattern may be established at call setup and not signaled as part of the mobile station assignments 510.

Thus, in FIG. 5b, Bit 002, 003 and 004 may form the ordering pattern field 513 for designating the appropriate ordering pattern, and Bit 001 may form an ordering patter invert field 515 for indicating whether the ordering pattern is in ascending or descending order.

In FIGS. 5a and 5b, the allocation sizes field 530 indicates radio resource assignment weighting information, and may also indicate a proportion of radio resources assigned, to the mobile stations. The radio resource assignment weighting information may also indicate a specified number or size of radio resources assigned to each mobile station.

In some embodiments, the radio resource assignment weighting information may also include vocoder rate, modulation, or coding information. If there is only one possible weighting value, the allocation sizes field 530 may be omitted. The information element 501 which contains the mobile station assignments field 510 and, if used, the allocation sizes field 530 as discussed above, are sent to the mobile station group over the shared control channel. Also as discussed above the mobile station group also shares a set of time-frequency resources. The shared control channel is typically transmitted by the base station 103 in each long frame for assigning resources within the long frame, although it is understood that the shared control channel could be transmitted by the base station 103 in any preceding long frame. In the various embodiments, the information element 501 may also include a failure handling field 540 which may comprise any appropriate number of bits and which will be described in further detail below.

If a group defined by the base station 103 contains any broadcast/multicast mobile stations or mobile stations participating in a group call, the assignments field 510 may be subdivided into two fields, for example, a broadcast/multicast/group field and a unicast field. For unicast, a single mobile station is assigned to a group position, while for group, multicast, and broadcast, more than one mobile station may be assigned to a group position as previously discussed. The interlace patterns for broadcast, multicast, group calls and unicast calls may have different durations and utilize various modulation and coding schemes. Further, the assignments field may only include unicast mobile stations, thereby eliminating the broadcast/multicast/group field. Similarly, the assignments field may only include a broadcast/multicast/group field, thereby eliminating unicast mobile stations. Further, the broadcast/multicast/group field may be encoded independently from the unicast field. In this case, the broadcast/multicast/group field would have one allocation sizes fields 530, while the unicast field would have a different allocation sizes field 530. For broadcast, multicast, and group calls, the assigned group position can be the same in multiple sectors thereby allowing the transmissions from multiple base stations to combine over the air. Further, it is advantageous to have these group positions occur at the beginning of the terminal assignments field, thereby allowing the same resource to be allocated in multiple sectors by the base stations.

Figure 6:
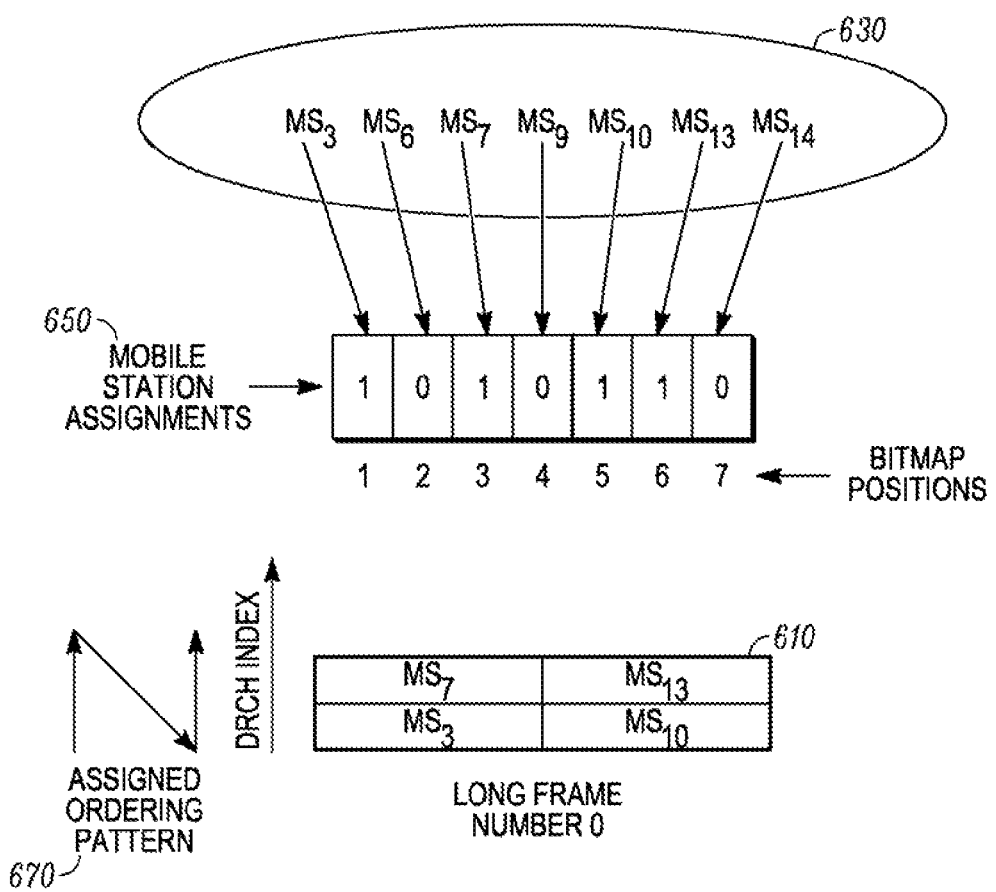
FIG. 6 is a diagram showing an exemplary resource allocation and ordering pattern for a group of mobile stations.

FIG. 6 provides further details of mobile station assignments and ordering pattern assignment. In the example of FIG. 6, the allocation sizes field 530 is not used. In FIG. 6, mobile stations are assigned to a group 630 and are assigned group positions 1 through 7, which correspond to bitmap positions 1 through 7 in the mobile station assignments field 650. In particular, mobile station 3 ($MS_3$) is assigned bitmap position 1, mobile station 6 ($MS_6$) is assigned bitmap position 2, etc.

In addition to position information, the base station 103 also indicates the set of shared resources 610 and an ordering pattern 670 indicative of the order in which the resources are allocated. The mobile station assignment field, will also provide indication of active mobile stations in each long frame with, for example, a binary "1."

As discussed above, the mobile station assignments field is transmitted on a shared control channel every long frame. Based on the mobile station assignments field, the Nth active mobile station in each long frame is assigned the Nth resource. Referring to FIG. 6, $MS_3$ is assigned the first resource, because for example it is the first mobile station with a "1" in the mobile station assignments field. $MS_7$ is the second mobile station with a "1" in the mobile station assignments field, thus $MS_7$ is assigned the second resource. Similarly, $MS_{10}$ is assigned the third resource, and $MS_{13}$ is assigned the fourth resource.

Figure 7:
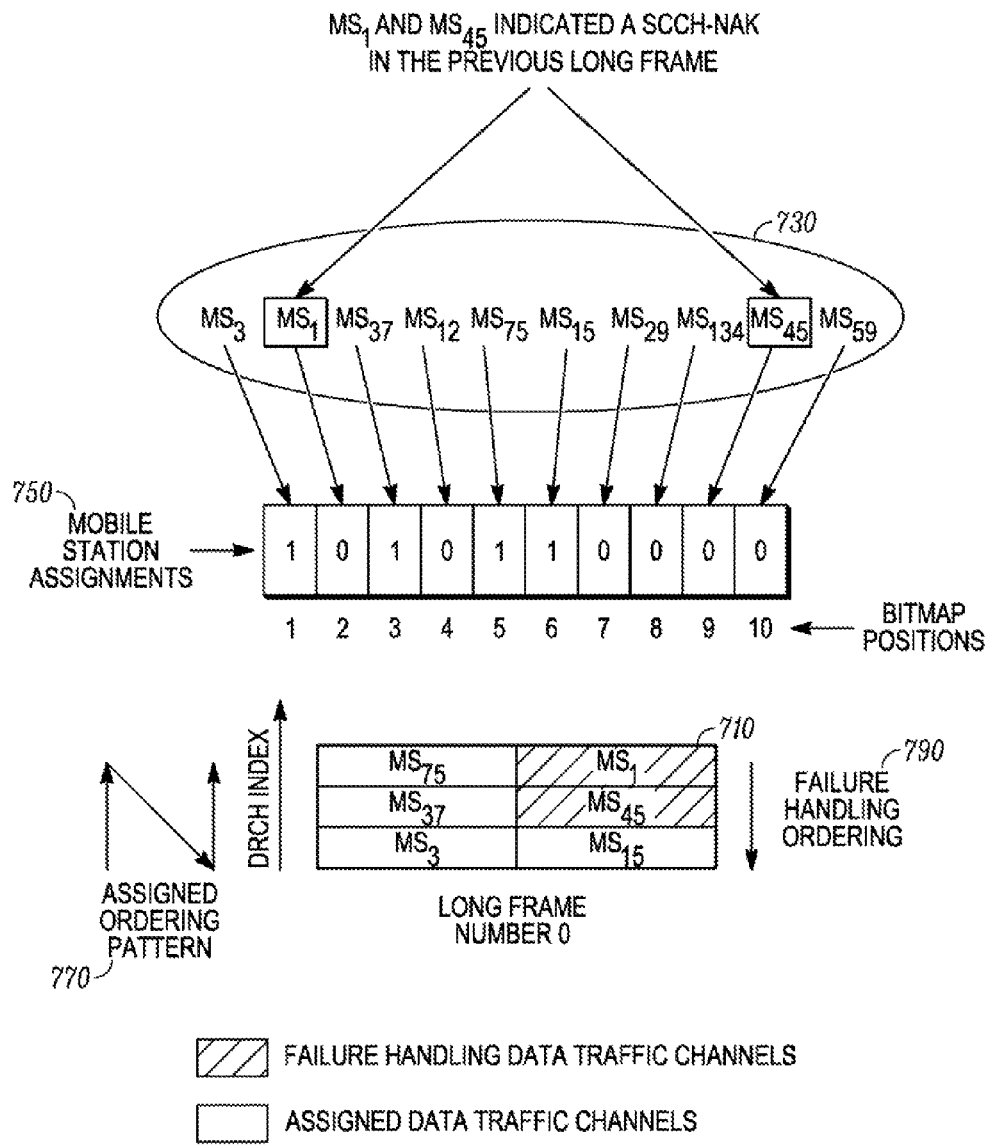
FIG. 7 is a diagram showing an exemplary resource allocation and ordering pattern in accordance with various embodiments.

FIG. 7 provides an illustrative example of mobile station assignments and ordering pattern assignment in accordance with the various embodiments. For the various embodiments exemplified by FIG. 7, failure handling data traffic channels are utilized for mobile stations that are not able to reliably decode the shared control channel. Referring to FIG. 7, $MS_3$, $MS_1$, $MS_{37}$, $MS_{12}$, $MS_{75}$, $MS_{15}$, $MS_{29}$, $MS_{134}$, $MS_{45}$, and $MS_{59}$ are assigned to mobile station group 730 and are assigned positions 1 through 10 within the group, respectively.

The mobile station group 730 is assigned a set of 6 shared resources 710 denoted as the assigned data traffic channels 710 and an ordering pattern 770. Further, the group 730 is assigned two shared resources denoted as failure handling data traffic channels, which are the last two resources of the set of shared resources 710. Finally, the group is assigned a failure handling ordering pattern 790 indicative of which order the failure handling data traffic channels are to be allocated.

For example, in the various embodiments, $MS_1$ and $MS_{45}$ may send a negative-acknowledgement of the shared control channel (SCCH-NAK) message to the base station 103 in a previous long frame, thereby informing the base station 103 of their failure to reliably decode the shared control channel. In response, the base station 103 will assign $MS_1$ to the first failure handling data traffic channel and $MS_{45}$ to the second failure handling data traffic channel according to the failure handling ordering pattern 790. The remaining mobile stations are then allocated the remaining data traffic channels 710. Note that if only one mobile station has sent an SCCH-NAK message, then the remaining failure handling data traffic channel may be used by the base station 103 as an assigned data traffic channel.

For the example illustrated by FIG. 7, the base station 103 may assign data traffic channels one through four, using the mobile station assignments field 750, to $MS_3$, $MS_{37}$, $MS_{75}$, and $MS_{15}$, respectively as shown in 710. Each mobile station, with the exception of $MS_1$ and $MS_{45}$, will attempt to decode the shared control channel to find the mobile station assignments field 750.

In the various embodiments, $MS_1$ and $MS_{45}$, having failed to receive or otherwise decode the shared control channel, will perform blind detection on the set of two failure handling data traffic channels, beginning with the first failure handling data traffic channel according to the failure handling ordering pattern 790 as described previously. Note that the mobile station assignments field 750 will indicate that $MS_1$ and $MS_{45}$ are inactive, that is, a binary '0' may be present in their respective mobile station assignment positions of the bitmap field. Further, for the various embodiments, the failure handling assignments of $MS_1$ and $MS_{45}$ are persistent allocations. A persistent allocation means that the same mobile station will be assigned the same failure handling data traffic channel until a timer elapses, a call burst is completed, the packet is acknowledged, the base station 103 assigns the channel to another mobile station, or until the channel conditions change at the mobile station such that it may reliably decode the shared control channel.

In order to free up the failure handling data traffic channels when there are no mobile stations requiring failure handling, the use of persistent allocations requires the use of additional bits in the shared control channel. These additional bits are used to indicate to the mobile stations receiving the shared control channel which of the failure handling data traffic channels are in use for each long frame.

As shown in FIGS. 5a and 5b, the shared control channel may include the failure handling field 540, in addition to the mobile station assignments field 510 and the optional allocation sizes field 530. The failure handling field 540 informs the mobile stations of which failure handling data traffic channels are in use.

Thus, in the various embodiments the failure handling field 540, is a bitmap wherein each bit of the bitmap may corresponds to one of the failure handling data traffic channels. If the failure handling data traffic channels are a subset of the assigned data traffic channels, then each bit of the bitmap may further corresponds to one of the assigned data traffic channels. Note that the failure handling field 540 may be encoded together with the mobile station assignments 510 and allocation sizes 530 fields, or may be encoded independently.

Figure 8:
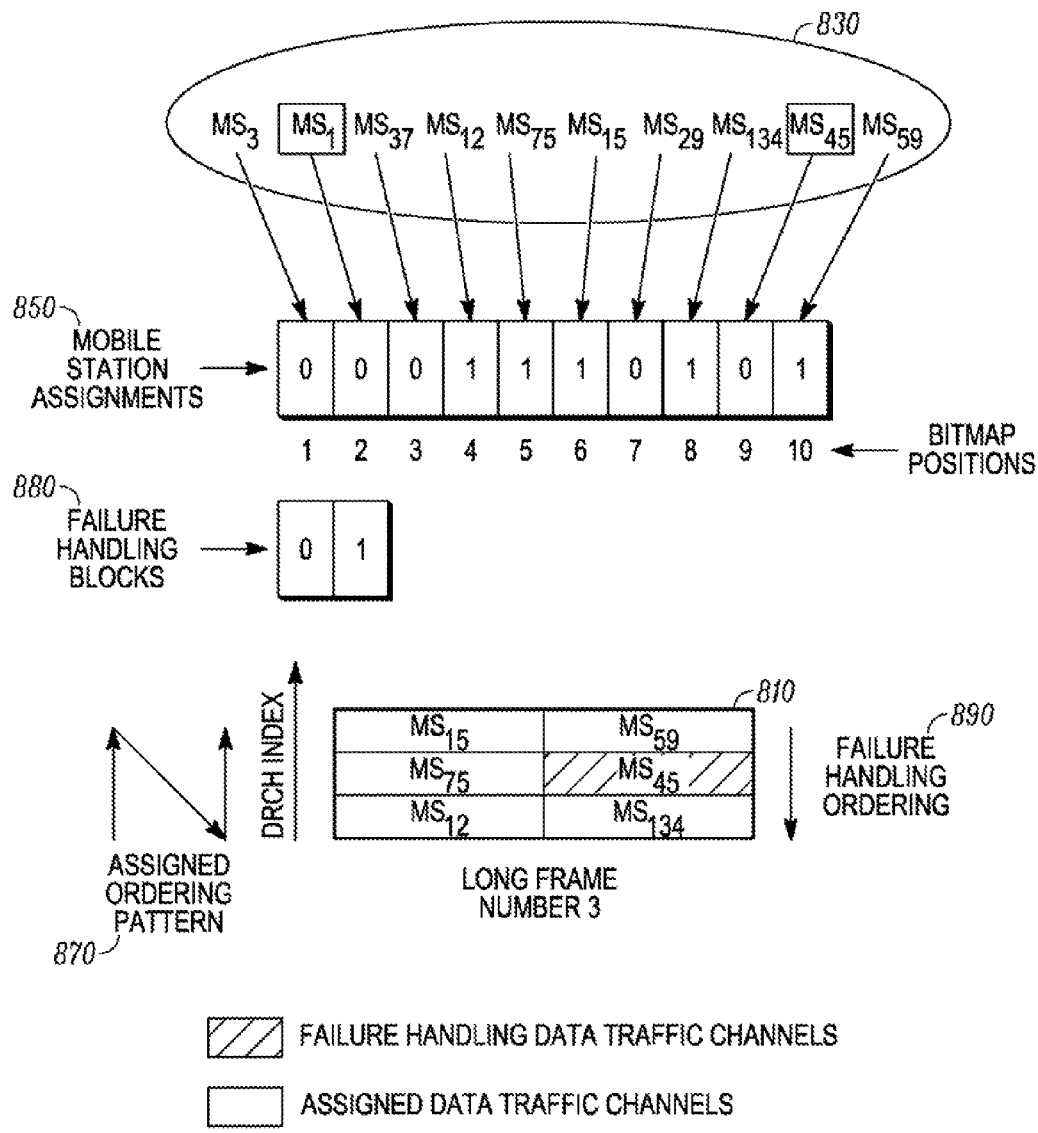
FIG. 8 is a diagram of another exemplary resource allocation and ordering pattern in accordance with various embodiments.

FIG. 8 illustrates an exemplary allocation policy of the various embodiments that uses the failure handling bitmap field 540. FIG. 8 assumes a moment in time subsequent to the example shown in FIG. 7, that is, a snapshot of long frame number 3 wherein the scenario depicted in FIG. 7 was a snapshot of long frame number 0. Thus for the example of FIG. 8, $MS_1$ which was unable to decode the shared control channel in FIG. 7 has subsequently succeeded and acknowledged its transmission, while $MS_{45}$ did not acknowledge its transmission after long frame 0.

Because $MS_{45}$ was assigned the second failure handling data traffic channel as a persistent allocation in long frame number 0, the base station 103 will continue transmitting data to $MS_{45}$ on the second failure handling data traffic channel. Further, the base station 103 would like to free the first failure handling data traffic channel for use as an assigned data traffic channel. To accomplish this, the base station 103 sends a failure handling field 540, where the failure handling field 540 is a length two bitmap, where the first bit of the bitmap corresponds to the first failure handling data traffic channel (the sixth assignable data traffic channel), and the second bit of the bitmap corresponds to the second data traffic channel (the fifth assignable data traffic channel). To indicate that the first failure handling data traffic channel is free, while the second failure handling data traffic channel is occupied, the base station 103 may populate the two-bit field, for example Bit 113 and 114 of FIG. 5b, with "01," wherein the binary "0" represents the available channel and the binary "1" represents the occupied channel.

Based on this information, the mobile stations receiving the shared control channel may determine which of the failure handling data traffic channels are in use during each long frame. In this illustrative example of FIG. 8, the base station 103 assigns $MS_{12}$, $MS_{75}$, $MS_{15}$, $MS_{134}$, and $MS_{59}$ to one of the shared resources. $MS_{12}$, $MS_{75}$, $MS_{15}$, $MS_{134}$ determine their assigned resources via the mobile station assignment field 510 of the shared control channel. $MS_{59}$ also uses the failure handling blocks field to determine that the fifth data traffic channel is taken, and therefore determines that it is assigned the sixth data traffic channel. $MS_{45}$ continues to perform blind detection on failure handling data traffic channels 1 and 2.

The processing at the mobile station associated with blind detection may not be desirable under some circumstances. Therefore, in some embodiments, upon the base station 103 determining that a mobile station is not able to reliably decode the shared control channel, it transmits a failure handling control channel to the mobile station, where the failure handling control channel has a greater reliability than the shared control channel. The failure handling control channel may contain information for multiple mobile stations or may contain information for only the intended mobile station. For example, the failure handling control channel information may include an indication of the assigned data traffic channel, or an indication of the failure handling data traffic channel, and an indication of the target mobile station. This assignment may be for one long frame or may be a persistent allocation as described previously. For example, referring again to FIG. 7, in this embodiment, the BTS would have assigned $MS_1$ to failure handling data channel 1 and $MS_{45}$ to failure handling data channel 2 through explicit signaling, thereby eliminating any blind detection. As described previously, if the failure handling control channel contains persistent assignments, the same mobile station will be assigned the same failure handling data traffic channel until a timer elapses, a call burst is completed, the packet is acknowledged, the base station 103 assigns the channel to another mobile station, or until the channel conditions change at the mobile station such that it may reliably decode the shared control channel. Further in the various embodiments, high quality of service (QoS) mobile stations may be assigned persistent channels as described above, in cases where the error rate on the shared control channel is not acceptable.

In another embodiment, persistent assignments are not used, but rather a failure handling shared control channel is used to control the mobile stations occupying the failure handling data traffic channels as a group or sub-group of the primary mobile station grouping. In this embodiment, the failure handling shared control channel may also contain a mobile station assignments field, where each mobile station corresponds to a bit in the mobile station assignments field for example. Therefore, this embodiment may be considered as creating two mobile station groups, a primary group and a failure handling group. The failure handling shared control channel may be used by the primary group to determine the number of failure handling data traffic channels that are in use, while the failure handling group may use it to determine when the bases station 103 is sending packets to each group member. The failure handling control channel is encoded in such a way as to have a greater reliability than the shared control channel. As an alternative, the need of the primary group to decode the failure handling shared control channel may be eliminated by indicating the number of failure handling blocks that are being used by the failure handling group as part of the shared control channel. Note that more than two groups may also be created in some embodiments. For example, mobile stations may be grouped according to various reported parameters or mobile station capabilities as was discussed above with respect to overall mobile station grouping.

Figure 9:
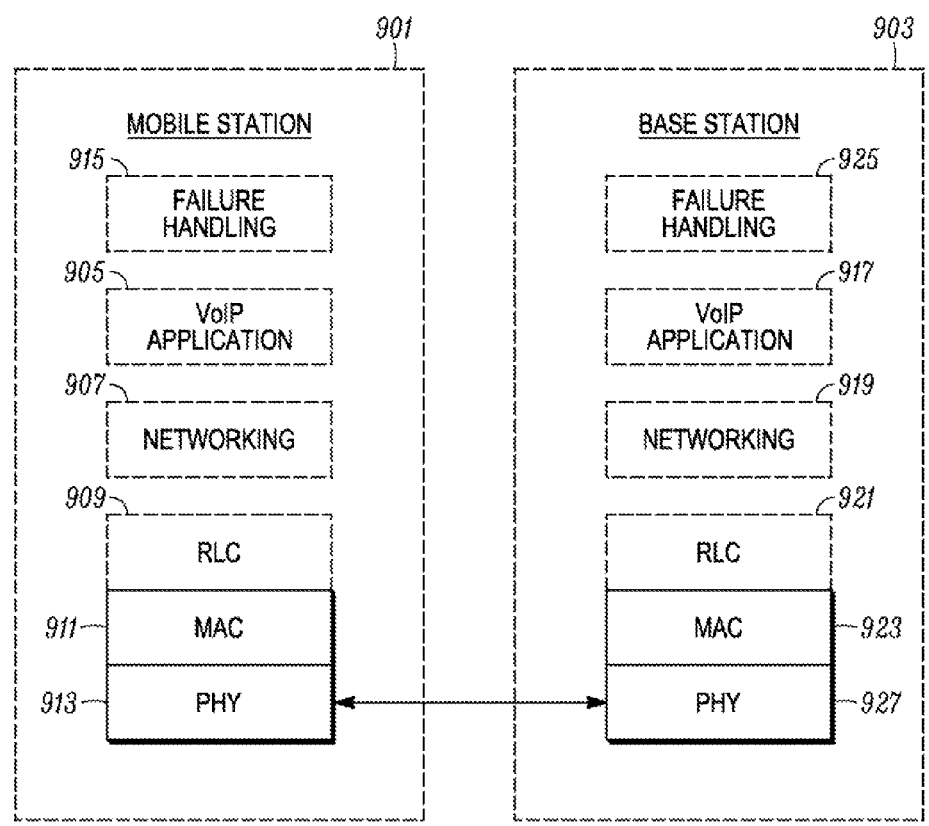
FIG. 9 is a block diagram of a mobile station and base station architecture in accordance with various embodiments.

Turning now to FIG. 9, a mobile station 901 and base station 903 architectures in accordance with the various embodiments are illustrated. Mobile station 901 comprises a stack having a VoIP application 905, a networking layer 907, a Radio Link Controller (RLC) 909, a Medium Access Controller (MAC) 911, and a Physical Layer (PHY) 913. In addition, mobile station 901 has failure handling component 915, which may be separate or may be integrated into any of the other components/layers.

The base station 903 similarly has a VoIP application 917, a networking layer 919, a RLC 921, MAC 923 and PHY 927. However, base station 903 additionally has in the various embodiments failure handling component 925. As described in detail above, the mobile station 901 failure handling 915, having failed to decode a shared control channel will interact with other components/layers as required, and described in detail above, to perform blind detection of failure handling channels allocated by base station 903 or to process failure handling data traffic channels explicitly assigned by the base station. The failure handling component 925 of base station 903 likewise will communicate and interact with other components/layers as required, and described in detail above, to allocate failure handling resources as necessary.

Figure 10:
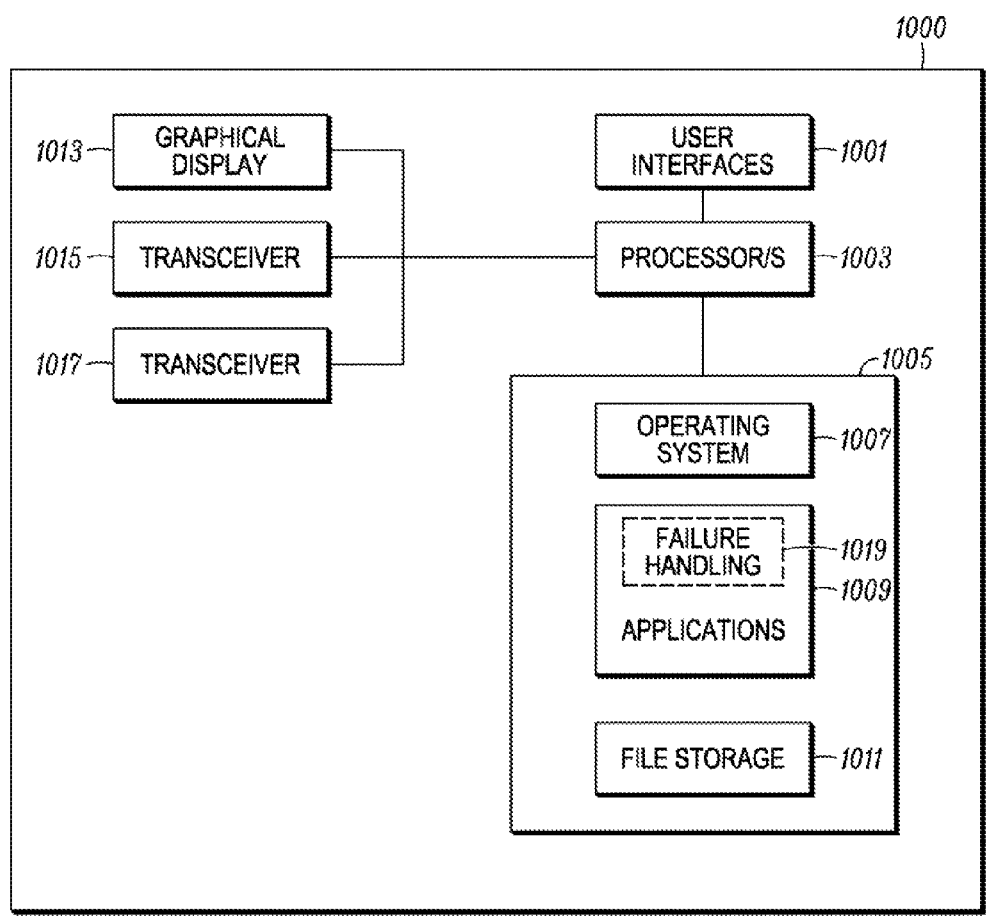
FIG. 10 is a block diagram of a mobile station in accordance with various embodiments.

FIG. 10 is a block diagram illustrating the primary components of a mobile station in accordance with some embodiments. Mobile station 1000 comprises user interfaces 1001, at least one processor 1003, and at least one memory 1005. Memory 1005 has storage sufficient for the mobile station operating system 1007, applications 1009 and general file storage 1009. Mobile station 1000 user interfaces 1001, may be a combination of user interfaces including but not limited to a keypad, touch screen, voice activated command input, and gyroscopic cursor controls. Mobile station 1000 has a graphical display 1013, which may also have a dedicated processor and/or memory, drivers etc. which are not shown in FIG. 10.

It is to be understood that FIG. 10 is for illustrative purposes only and is for illustrating the main components of a mobile station in accordance with the present disclosure, and is not intended to be a complete schematic diagram of the various components and connections therebetween required for a mobile station. Therefore, a mobile station may comprise various other components not shown in FIG. 10 and still be within the scope of the present disclosure.

Returning to FIG. 10, the mobile station 1000 may also comprise a number of transceivers such as transceivers 1015 and 1017. Transceivers 1015 and 1017 may be for communicating with various wireless networks using various standards such as, but not limited to, UMTS, E-UMTS, E-HRPD, CDMA2000, 802.11, 802.16, etc.

Memory 1005 is for illustrative purposes only and may be configured in a variety of ways and still remain within the scope of the present disclosure. For example, memory 1005 may be comprised of several elements each coupled to the processor 1003. Further, separate processors and memory elements may be dedicated to specific tasks such as rendering graphical images upon a graphical display. In any case, the memory 1005 will have at least the functions of providing storage for an operating system 1007, applications 1009 and general file storage 1011 for mobile station 1000. In some embodiments, and as shown in FIG. 9, applications 1009 may comprise a software stack that communicates with a stack in the base station. Therefore, applications 1009 may comprise failure handling component 1019 for providing the capabilities of using the failure handling data traffic channels as described in detail above.

Figure 11:
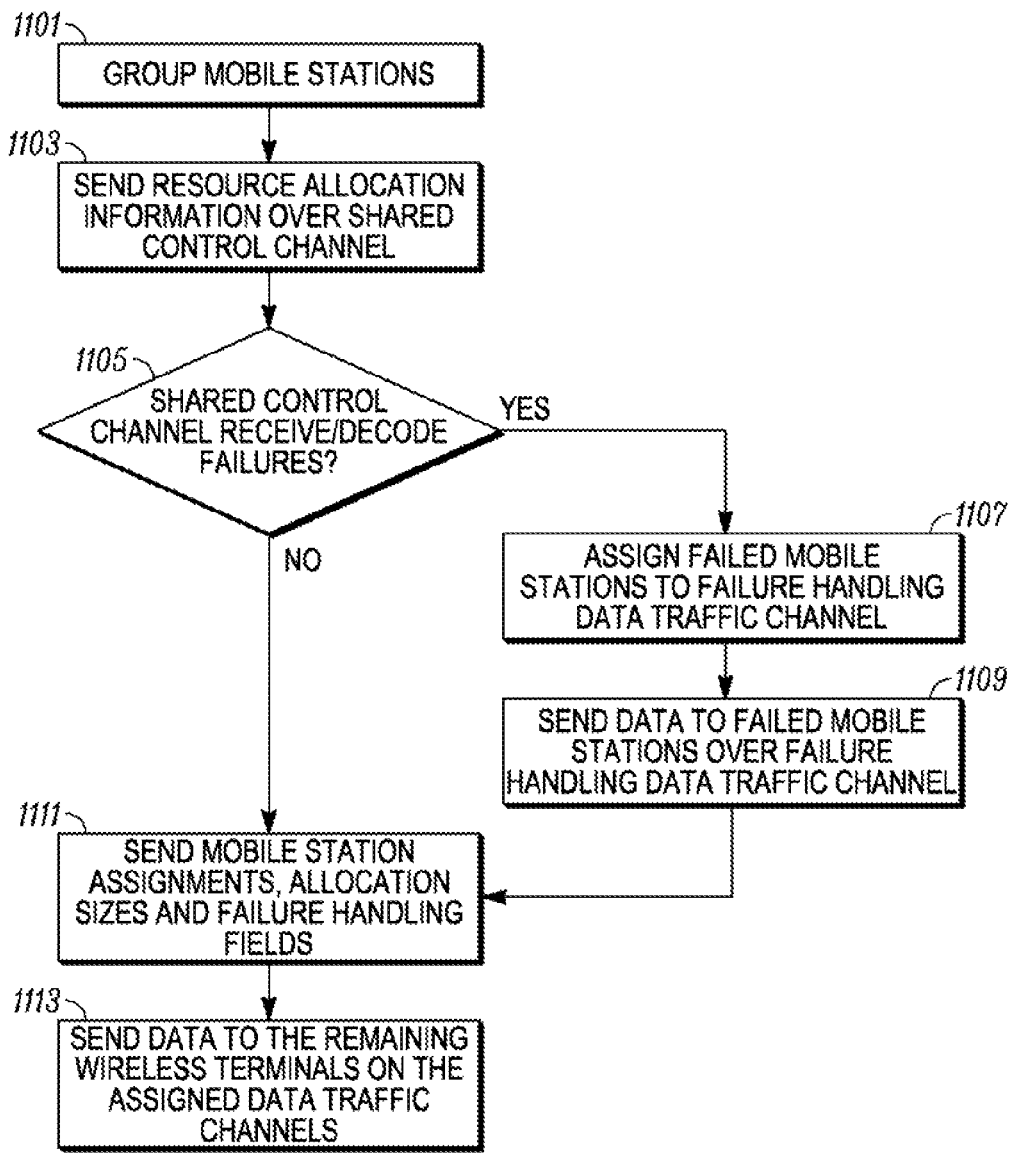
FIG. 11 is a flow chart showing operation of the base station in accordance with an embodiment.

FIG. 11 summarizes operation of a base station in accordance with the various embodiments. Thus, in 1101 a group of mobile stations is formed as was discussed previously by for example, reported parameters, radio conditions, mobile station capabilities, physical location, or any other appropriate criteria. The base station in 1103, sends the shared control channel information, such as the bitmapping described with respect to FIGS. 5a and 5b, to the group of mobile stations.

The base station must ensure that a majority of the mobile stations in the group may receive and/or reliably decode the shared control channel. This is necessary, because as was described above, a mobile station will determine its assigned resource via bitmap fields of the shared control channel. The base station may determine the shared control channel reception capability for a particular mobile station based on channel quality indications (CQI), power control indications, an explicit failure message, etc., sent from the mobile station to the base station. For example, the explicit failure message from the mobile station may be a shared control channel negative acknowledgment (SCCH-NAK) as was described above. Alternatively, the explicit failure message from the mobile station may be a data channel negative acknowledgment.

The SCCH-NAK message may be sent by the mobile station if it is unable to decode M of N control channels, where N≥M and where M and N are known in advance, a priori, by the mobile station. For example, if M=2 and N=4, the mobile station will send a SCCH-NAK if it was unable to decode 2 of the previous 4 instances of the shared control channel. Alternatively, if M=1 and N=1, the mobile station will send a SCCH-NAK any time it is unable to successfully decode the shared control channel.

Based on the ability of the mobile station group to successfully decode the shared control channel, the base station may allocate more or less system resources to the shared control channel, such as, but not limited to, power, OFDM symbols, OFDM subcarriers, or the like. For example, if the base station has not received any SCCH-NAK message for some period of time, it may allocate less power to the shared control channel. Alternatively, if the base station receives numerous SCCH-NAK messages, it may allocate more subcarriers to the shared control channel.

Based on the base station determining that a particular mobile station is not able to reliably decode the shared control channel, the base station may increase the amount of system resources for the shared control channel as previously described, or it may determine that it benefits the system more to control the particular mobile station using alternate techniques.

Returning to FIG. 11, in 1105 upon determining that a particular mobile station is not able to receive or otherwise reliably decode the shared control channel, the base station assigns the mobile station to one of a set of failure handling data traffic channels as in 1107. The set of failure handling data traffic channels and the order in which they are allocated are known in advance, a priori, by the mobile station. The failure handling data traffic channels may be a subset of the assigned data traffic channels as was discussed previously. In some embodiments, the failure handling data traffic channels may have a different transmission capability than the assigned data traffic channels. For example, the failure handling data traffic channels may be allocated more OFDM symbols, more OFDM subcarriers, or more power. After the mobile station transmits the indication that it is not able to reliably decode the shared control channel, it then does blind detection on the set of failure handling data traffic channels assigned in 1107.

Figure 12:
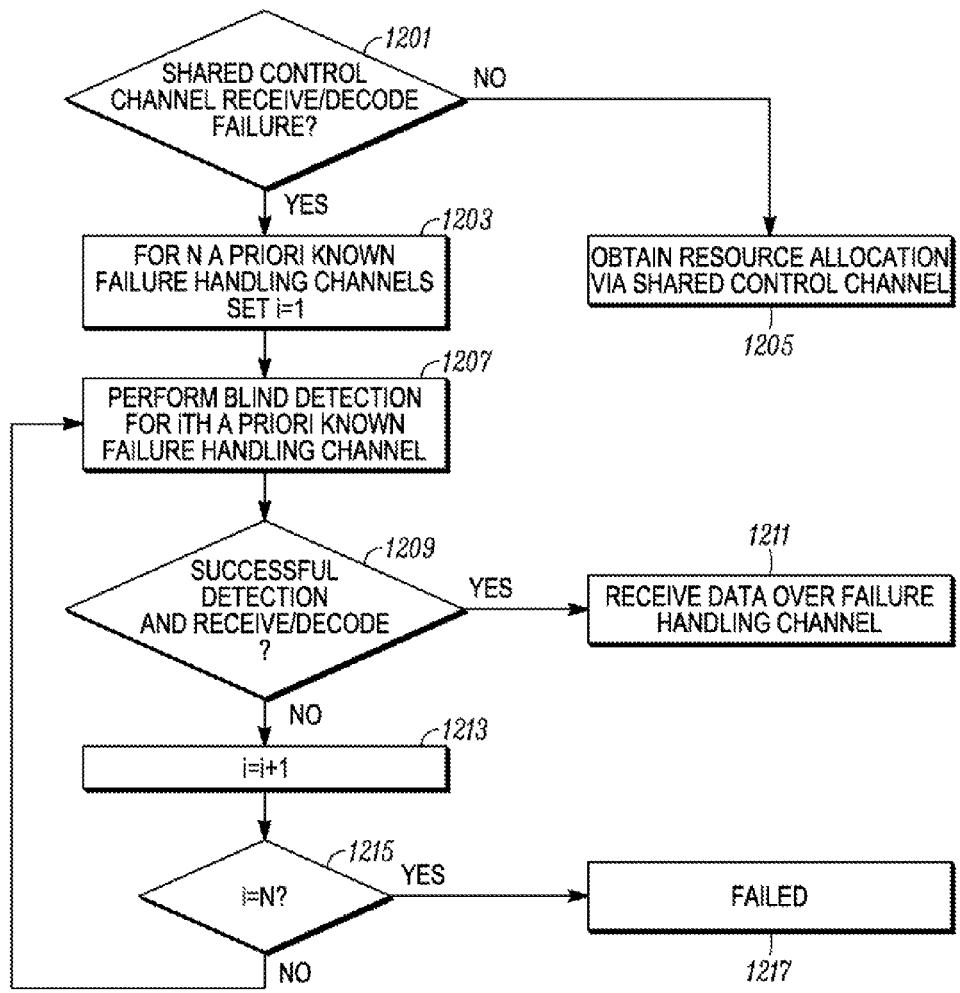
FIG. 12 is a flow chart showing operation of a mobile station in accordance with an embodiment.

For example, turning to FIG. 12, if there are several failure handling data traffic channels, the mobile station will attempt to decode each data traffic channel sequentially during the next transmission instance until successful. Thus, in 1201 if the shared control channel cannot be decoded, the mobile station is aware of N failure handling channels as in 1203.

Alternatively, to eliminate blind detection, the base station can indicate that an explicit failure handling data traffic channel is assigned to a particular mobile station using a failure handling shared control channel. In this case, the mobile station will attempt to decode the failure handling data traffic channels indicated on the failure handling shared control channel. In this case, the mobile station obtains its resource allocation via the shared control channel as in 1205.

Thus for a failure, the mobile station in 1207 will attempt to decode the first failure handling data traffic channel. If the mobile station is able to decode the first failure handling data traffic channel in 1209, it sends an acknowledgement to the base station and no further processing is needed. The mobile station may receive data over the failure handling channel as in 1211.

If the detection was not successful in 1209, the process is repeated for all N of the failure handling data traffic channels as shown in 1213 and 1215. If the mobile station is unable to decode a packet on any of the failure handling data traffic channels, it sends a negative acknowledgement to the base station in 1217.

To ensure that only the targeted mobile station is able to decode the data on the failure handling data traffic channels, the data may be scrambled with a scrambling code that is uniquely associated with the targeted mobile station. When a mobile station is assigned to a failure handling data traffic channel, the base station may simply send a binary "0" in the bitmap position corresponding to the mobile station in the mobile station assignments field. In some embodiments, the mobile station transitions back to monitoring the shared control channel after some known period of time, for example the duration of one superframe, therefore making it desirable to maintain the bitmap position in the shared control channel for that mobile station.

In alternate embodiments, the base station reassigns the bitmap position for a mobile station that is not able to reliably decode the shared control channel to a different mobile station. Once a mobile station is assigned to a particular failure handling data traffic channel, the mobile station will typically maintain the same failure handling data traffic channel. This type of assignment is denoted a persistent allocation as was described previously above.

Thus, returning to FIG. 11, the base station may assign the mobile station to a failure handling data traffic channel persistently as in 1107, and send data thereby as in 1109. The base station may then proceed with the shared control channel information, for example in next superframe, as in 1111 and send data to the remaining mobile stations of the group using the assigned traffic channels.

In some embodiments, the size of the shared control channel may be reduced by excluding bits within the mobile station allocations field during the Nth HARQ transmission for a particular set of mobile stations, where N is an integer and is typically the last HARQ transmission in a series of HARQ transmissions. Each active mobile station will receive a first HARQ transmission, with fewer mobile stations in each subsequent transmission, and the fewest mobile stations in the last transmission. Therefore, in such embodiments, a rule is established that, for any mobile station requiring the Nth transmission, one of the set of failure handling data traffic channels will be used. Then, each mobile station requiring the Nth transmission will perform blind detection on the set of failure handling data traffic channels as described above. For example, if N=4 and a mobile station did not acknowledge the packet after the third transmission, it will perform blind detection on the set failure handling data traffic channels during the time period when it expects its fourth transmission.

Figure 13:
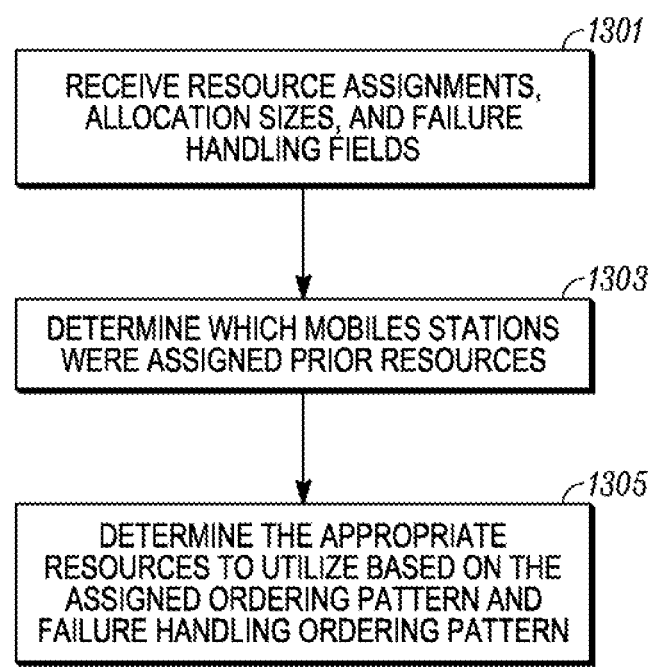
FIG. 13 is a flow chart showing operation of a mobile station in accordance with various embodiments.

FIG. 13 is a flow chart showing basic operation of a mobile station in receiving the shared control channel information. In 1301 the mobile station receives an assignments field, an optional allocation sizes field, and an optional failure handling field. In 1303 the mobile station determines assigned prior resources and utilizing this information and allocation sizes, as well as the failure handling field, determines its own appropriate resources to utilize based on the ordering pattern and failure handling ordering pattern as in 1305.

While various embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of operating a communication network comprising:
    defining a set of mobile stations as a group;
    defining a set of radio channel resources for allocation to said group;
    reserving at least one radio channel resource of said set of resources as a failure handling resource;
    sending control information to said group including indication of said set of radio channel resources and said failure handling resource;
    sending common control information to the group indicating resource assignments;
    determining that a specific mobile station of said group cannot reliably decode said common control information indicating resource assignment, based on receiving a notification message from the specific mobile station that the common control information could not be reliably decoded, wherein the notification message is a common control channel negative acknowledgement;
    in response to the notification message, assigning said failure handling resource to said specific mobile station;
    sending a bitmap having a bit position corresponding to said failure handling resource wherein said bit position provides an indication that said failure handling resource is allocated; and
    sending data that is not retransmitted common control information, to said specific mobile station using said failure handling resource that was allocated based on determining that common control information could not be reliably decoded by the specific mobile station.

2. The method of claim 1, wherein determining that a specific mobile station of said group cannot reliably decode said common control information, further comprises:
    receiving a message from said specific mobile station comprising channel quality condition information.

3. The method of claim 1, wherein assigning said failure handling resource to said specific mobile station, further comprises:
    including identification information of said specific mobile station and said failure handling resource in a message sent via a control channel.

4. The method of claim 1, further comprising:
    determining an ordering pattern for said failure handling resource; and
    including an indication of said ordering pattern in said common control information.

5. The method of claim 1, wherein sending data to said specific mobile station using said failure handling resource, further comprises:
    scrambling or encoding said data in a manner unique to said specific mobile station.

6. The method of claim 1, wherein sending the bitmap comprises sending a bitmap comprising at least one of a mobile station resource allocation field, a failure handling resource allocation field, a mobile station group order field, or an ordering pattern field.

7. The method of claim 6, wherein said mobile station group order indicates an order of mobile station resource assignments.

8. The method of claim 7, wherein at least two mobile stations are assigned an identical group position via said group order field.

9. The method of claim 8, wherein said group position indicates a presence of one of a broadcast/multicast message and a group call.

10. A method of operating a mobile station comprising:
    storing a set of failure handling channel identifiers received from a communication network;
    communicating in a Voice-over-Internet-Protocol session using a common control channel received from a base station;
    determining that said common control channel cannot be reliably decoded and sending a common control channel negative acknowledging message (NAK) in response thereto that the common control information could not be reliably decoded;
    receiving, after sending the NAK that the common control information could not be reliably decoded, a bitmap having a bit position corresponding to a failure handling channel wherein said bit position provides an indication that said failure handling channel is allocated; and
    receiving data that is not retransmitted common control information, on the failure handling channel after sending the common control channel negative acknowledging message (NAK) that the common control information could not be reliably decoded.

11. The method of claim 10, wherein determining that said common control channel has not been received, further comprises: sending the negative acknowledging message after a predetermined time period; and determining that an internal timer has timed out prior to performing a blind detection.

12. A method of operating a mobile station comprising:
    storing a set of failure handling channel identifiers;
    communicating in a Voice-over-Internet-Protocol session using a shared control channel received from a base station;
    determining that a common control channel cannot be reliably decoded and sending a negative acknowledge message in response thereto;
    receiving, in a message sent via a control channel, a bitmap having a bit position corresponding to a failure handling resource wherein said bit position provides an indication that said failure handling resource is allocated; and
    receiving data that is not retransmitted common control channel, on said assigned failure handling resource after sending the negative acknowledge message in response to determining that the common control channel cannot be reliably decoded.

13. A base station comprising:
    a transceiver;
    a processor coupled to said transceiver, said processor configured to:
    define a set of mobile stations as a group;
    define a set of radio channel resources for allocation to said group;
    reserve a subset of said radio channel resources as a failure handling set;
    send control information to said group including indication of said failure handling set;
    send a common control information to the group indicating resource assignments;
    determine that a specific mobile station of said group cannot reliably decode said common control information indicating resource assignment, based on receiving a notification message from the specific mobile station that the common control information could not be reliably decoded, wherein the notification message is a common control channel negative acknowledgement;

in response to the notification message, assign one radio channel resource of said failure handling set to said specific mobile station; and send data that is not retransmitted common control information, to said specific mobile station using said radio resource that was allocated based on determining that the common control information could not be reliably decoded by the specific mobile station; wherein said processor is further configured to send a bitmap having a bit position corresponding to said radio channel resource of said failure handling set wherein said bit position provides an indication that the radio channel resource of said failure handling set is allocated.

14. The base station of claim 13, wherein said processor is further configured to determine that a specific mobile station of said group cannot reliably decode said common control information by receiving a notification message from said specific mobile station.

15. The base station of claim 13, wherein said processor is further configured to: determine that a specific mobile station of said group cannot reliably decode said common control information by receiving a message from said specific mobile station comprising channel quality condition information.

16. The base station of claim 13, wherein said processor is further configured to assign said radio channel resource of said failure handling set to said specific mobile station by including identification information of said specific mobile station in a message sent via a control channel.

17. The base station of claim 13, wherein said processor is further configured to determine an ordering pattern for said failure handling set and include an indication of said ordering pattern in said control information.

18. The base station of claim 13, wherein said processor is further configured to scramble or encode said data prior to sending said data to said specific mobile station using said radio channel resource of said failure handling set.

19. The base station of claim 13, wherein said processor is further configured to send a bitmap comprising at least one of a mobile station resource allocation field, a failure handling resource allocation field, a mobile station group order field, or an ordering pattern field.

20. A communication system comprising:
a base station operative to assign a set of mobile stations to a group wherein the group shares a set of radio resources and operative to send a shared control channel information element to the group of mobile stations and providing a bitmap having fields for group ordering, resource allocations, failure handling resources and an ordering pattern;
a mobile station, in operative communication with the base station, operative to:
determine if the mobile station cannot reliably decode common control information sent by the base station wherein the common control information indicates resource assignment;
send a common control channel acknowledgement message indicating that the common control information could not be reliably decoded;
access failure handling resources using the bitmap failure handling resource information and ordering pattern information in response to determining that the common control channel could not be reliably decoded; and
receive data from the base station, that is not retransmitted common control information, on a detected failure handling resource channel.

\* \* \* \* \*